(12) United States Patent
Choi et al.

(10) Patent No.: US 10,363,708 B2
(45) Date of Patent: Jul. 30, 2019

(54) COMPOSITION FOR PREPARING LIGHTWEIGHT TRANSPARENT COMPOSITE, METHOD OF PREPARING COMPOSITE USING THE SAME AND COMPOSITE PREPARED THEREBY

(71) Applicant: Hyundai Motor Company, Seoul (KR)

(72) Inventors: Young Ho Choi, Seongnam-si (KR); Sang Sun Park, Anyang-si (KR); Kyung Mo Yang, Suwon-si (KR); Seok Hwan Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 710 days.

(21) Appl. No.: 14/962,973

(22) Filed: Dec. 8, 2015

(65) Prior Publication Data

US 2017/0037221 A1    Feb. 9, 2017

(30) Foreign Application Priority Data

Aug. 7, 2015    (KR) .................. 10-2015-0111788

(51) Int. Cl.
| | | |
|---|---|---|
| *B29C 70/20* | (2006.01) | |
| *B29C 70/48* | (2006.01) | |
| *B29K 309/08* | (2006.01) | |
| *B29K 75/00* | (2006.01) | |
| *B29L 31/30* | (2006.01) | |

(52) U.S. Cl.
CPC .............. *B29C 70/20* (2013.01); *B29C 70/48* (2013.01); *B29K 2075/00* (2013.01); *B29K 2309/08* (2013.01); *B29L 2031/30* (2013.01)

(58) Field of Classification Search
CPC ..... B29C 70/20; B29C 70/48; B29K 2309/08; B29K 2075/00; B29L 2031/30
See application file for complete search history.

(56) References Cited

U.S. PATENT DOCUMENTS

| | | | | |
|---|---|---|---|---|
| 5,712,331 | A | * | 1/1998 | Ryang ................ C08G 59/5066 523/400 |
| 6,706,370 | B1 | | 3/2004 | Ito et al. |
| 7,132,154 | B2 | | 11/2006 | Shibahara et al. |
| 7,250,209 | B2 | | 7/2007 | Shibahara et al. |

FOREIGN PATENT DOCUMENTS

| | | | |
|---|---|---|---|
| CA | 2472965 | * | 8/2003 |
| EP | 0347819 | | 12/1989 |
| EP | 0430026 | | 6/1991 |
| EP | 0296611 | | 3/1998 |
| JP | H06-305077 | | 11/1994 |
| JP | 2001-055646 | | 2/2001 |
| JP | 2006-212820 | | 8/2006 |
| JP | 2007203474 | | 8/2007 |
| JP | 2007203475 | A | 8/2007 |
| KR | 100372985 | B1 | 2/2003 |
| KR | 20040077879 | A | 9/2004 |
| KR | 20040089121 | A | 10/2004 |
| KR | 20070078384 | A | 7/2007 |
| KR | 20120080050 | A | 7/2012 |
| KR | 20140014550 | A | 2/2014 |
| KR | 10-1425334 | | 8/2014 |
| KR | 101526003 | B1 | 6/2015 |

\* cited by examiner

*Primary Examiner* — Patrick D Niland
(74) *Attorney, Agent, or Firm* — Brinks Gilson & Lione

(57) ABSTRACT

The present disclosure provides a composition for preparing a lightweight transparent composite, a method of preparing a composite using the same, and a composite prepared by the method. The lightweight transparent composite having excellent impact resistance, scratch resistance, weather resistance, and high hardness can be prepared by thermally curing a mixture of a glass fiber reinforcement having a refractive index of 1.4 to 1.6 and a curable resin having a deviation in refractive index of −0.005 to +0.005 from the glass fiber reinforcement. When the lightweight transparent composite is applied to transparent windows for automobiles, the lightweight transparent composite can be useful in enhancing fuel efficiency, achieving easier handling characteristics due to reduction in vehicle center of gravity, and improving juddering and dimensional stability even during car driving due to excellent hardness.

15 Claims, 2 Drawing Sheets

Figure 1:
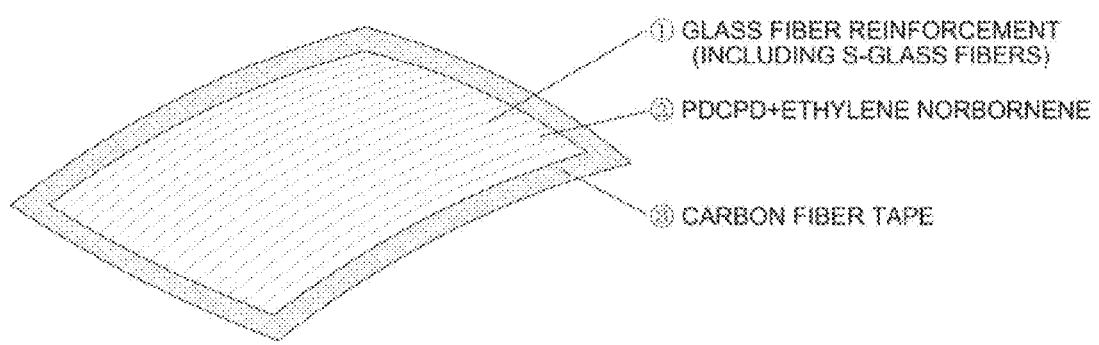

COMPOSITION FOR PREPARING LIGHTWEIGHT TRANSPARENT COMPOSITE, METHOD OF PREPARING COMPOSITE USING THE SAME AND COMPOSITE PREPARED THEREBY

CROSS-REFERENCE TO RELATED APPLICATIONS

This application claims the benefit of and priority to Korean Patent Application No. 10-2015-0111788, filed Aug. 7, 2015, which is incorporated herein by reference in its entirety.

FIELD

The present disclosure relates to a composition for preparing a lightweight transparent composite, a method of preparing a composite using the same, and a composite prepared by the method. More particularly, the present disclosure relates to a composition for preparing a lightweight transparent composite—exhibiting impact resistance, scratch resistance, weather resistance, and high hardness.

BACKGROUND

The statements in this section merely provide background information related to the present disclosure and may not constitute prior art.

Automobile sunroofs made of glass materials are heavy due to characteristics of the materials such as tempered glass, and are likely to naturally break when impurities remain in the glass materials and to cause damage to humans due to breakage and pieces of broken glass when vehicles are overturned. As an alternative to such glass materials, double-laminated glasses have often been used. However, these materials are still heavy and the manufacturing costs may increase due to complicated manufacturing processes. In addition, polycarbonate (PC) and polymethylmethacrylate (PMMA) have commonly been used as plastic materials. When polycarbonate (PC) is used, hardness may be insufficient, an increase in thickness may be encountered, and scratch and weather resistance may be poor. Polymethylmethacrylate (PMMA) as a replacement for conventional glass materials lacks impact resistance.

Japanese Unexamined Patent Publication No. 2006-212820 discloses a glass fiber sheet having both high light diffusibility and improved light transmissivity, and a method of manufacturing the same. The method includes stacking woven glass fiber fabrics in which a transparent resin composition has a high refractive index in a range of ±0.02, and impregnating the stacked glass fiber fabrics in a thermosetting resin having a norbornene-based backbone to prepare a fiber-reinforced composite. However, when the glass fiber sheet is applied to automobile sunroofs, or the like, the glass fiber sheet remains thin, has insufficient dimensional stability, and transparency may be degraded as the glass fiber sheet grows thick due to a difference in refractive index between glass fibers and the resin composition.

Therefore, there is a desire for transparent composites made of plastic materials which have improved automobile fuel efficiency through lightweight design by replacing the glass materials with the plastic materials, can achieve easier handling characteristics due to reduction in vehicle center of gravity, and shows excellent juddering and dimensional stability during driving due to excellent hardness.

SUMMARY

The present disclosure provides lightweight transparent composites having excellent impact resistance, scratch resistance, weather resistance, and high hardness. We have found that impact resistance, scratch resistance, weather resistance, and hardness of the transparent composites may be improved while maintaining transparency of materials when a glass fiber reinforcement is used together with a curable resin having a deviation in refractive index of ±0.005 from the glass fiber reinforcement.

In one form, the present disclosure provides a composition for preparing a lightweight transparent composite, which includes (A) a glass fiber reinforcement having a refractive index of 1.4 to 1.6, (B) a curable resin having a deviation in refractive index of −0.005 to +0.005 from the glass fiber reinforcement (A), and (C) a ruthenium-based catalyst.

In another form, the present disclosure provides a method of preparing a lightweight transparent composite, which includes (i) preparing a glass fiber reinforcement (A) having a refractive index of 1.4 to 1.6 in a forming mold, and (ii) injecting a polymer resin into the forming mold containing the glass fiber reinforcement (A), and thermally curing and molding the polymer resin. Here, the polymer resin may include a curable resin (B) having a deviation in refractive index of −0.005 to +0.005 from the glass fiber reinforcement (A), and a ruthenium-based catalyst (C).

In yet another form, the present disclosure provides a lightweight transparent composite prepared by the method.

In yet another form, the present disclosure provides a molded article for transparent automobile windows prepared using the lightweight transparent composite.

The present disclosure is not limited to the various forms referred to above. Rather, the present disclosure will be clarified through descriptions provided below and in the appended claims and combinations thereof.

In one aspect, the present disclosure provides a composition for preparing a lightweight transparent composite, which includes (A) a glass fiber reinforcement having a refractive index of 1.4 to 1.6, (B) a curable resin having a deviation in refractive index of −0.005 to +0.005 from the glass fiber reinforcement (A), and (C) a ruthenium-based catalyst.

In another aspect, the present disclosure provides a method of preparing a lightweight transparent composite, which includes (i) preparing a glass fiber reinforcement (A) having a refractive index of 1.4 to 1.6 in a forming mold, and (ii) injecting a polymer resin into the forming mold containing the glass fiber reinforcement (A), and thermally curing and molding the polymer resin. Here, the polymer resin may include a curable resin (B) having a deviation in refractive index of −0.005 to +0.005 from the glass fiber reinforcement (A), and a ruthenium-based catalyst (C).

In still another aspect, the present disclosure provides a lightweight transparent composite prepared by the method.

In a further aspect, the present disclosure provides a molded article for transparent automobile windows prepared using the lightweight transparent composite.

Further areas of applicability will become apparent from the description provided herein. It should be understood that the description and specific examples are intended for purposes of illustration only and are not intended to limit the scope of the present disclosure.

DRAWINGS

Figure 2:
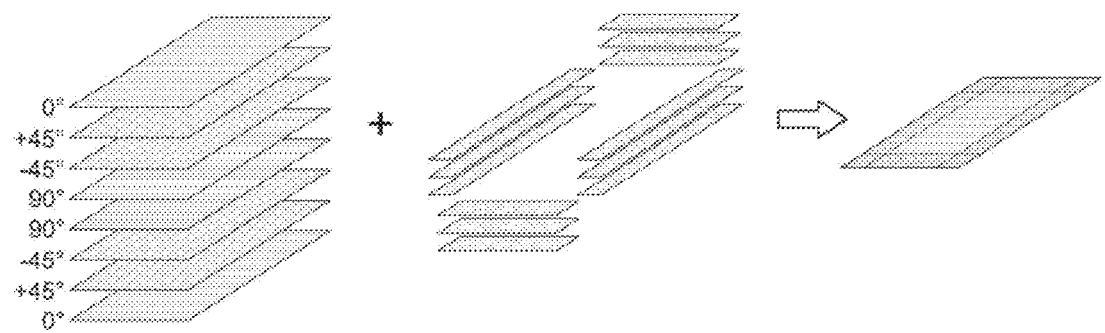

In order that the disclosure may be well understood, there will now be described various forms thereof, given by way of example, reference being made to the accompanying drawings, in which:

FIG. 1 is a diagram showing a lightweight transparent composite according to the teachings of the present disclosure; and FIG. 2 is a diagram showing a method of forming a fixed window according to Example 1 of the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter reference will be made in detail to various forms of the present invention, examples of which are illustrated in the accompanying drawings and described below. While the present disclosure is described in conjunction with various forms, it will be understood that the present description is not intended to limit the disclosure to these specific forms. On the contrary, the present disclosure is intended to cover not only the various forms described herein, but also various alternatives, modifications, equivalents and other forms, which may fall within the spirit and scope of the present disclosure as defined by the appended claims.

The present disclosure provides a composition for preparing a lightweight transparent composite including (A) a glass fiber reinforcement having a refractive index of 1.4 to 1.6, (B) a curable resin having a deviation in refractive index of −0.005 to +0.005 from the glass fiber reinforcement (A), and (C) a ruthenium-based catalyst.

The glass fiber reinforcement (A) includes one or more glass fibers (a) selected from the group consisting of S-glass fibers having a refractive index of 1.500 to 1.540, E-glass fibers having a refractive index of 1.540 to 1.570, and silica/quartz fibers having a refractive index of 1.450 to 1.460.

The S-glass fibers typically have a refractive index of 1.500 to 1.540, and thus homogenous materials whose deviation of refractive index is less than 0.005 may be used in order to minimize the deviation in refractive index from the curable resin.

In addition, the curable resin (B) may be selected according to a type of the glass fiber reinforcement. Specifically, a mixture of polydicyclopentadiene (pDCPD) having a refractive index of 1.510 to 1.515 and ethylene norbornene having a refractive index of 1.530 to 1.540 may be used when the S-glass fibers are selected.

In this case, the curable resin may be mixed at a mixing ratio so that the curable resin has a difference in refractive index of −0.005 to +0.005 from the S-glass fibers having a refractive index of 1.500 to 1.540 in order to realize transparency corresponding to those of the glass materials.

When the deviation in refractive index is outside of ±0.005, a haze value which represents the degree of light scattered with respect to transmitted light may increase, resulting in degraded transparency.

Next, when the E-glass fibers are selected, a resin including at least one selected from the group consisting of aromatic urethane acrylate, aromatic urethane diacrylate, aromatic urethane multiacrylate, halogen-substituted urethane acrylate, and sulfur (S)-containing urethane acrylate may be used as the curable resin (B). In one form, urethane diacrylate, and fluorine-substituted urethane acrylate may be used because of favorable scratch resistance with good transparency and high hardness. In another form, the bromine-substituted urethane acrylate or sulfur (S)-containing urethane acrylate may be used to easily adjust refractive index. The use of bromine-substituted urethane acrylate or sulfur (S)-containing urethane acrylate may also reduce overall transparency due to the presence of color. When overall transparency is desired, aromatic urethane diacrylate, and fluorine-substituted urethane acrylate can be used.

When the deviation in refractive index is outside of ±0.005, transparency may be degraded. As a result, the resin is used within the range described above.

In addition, when the silica/quartz fibers are selected, urethane acrylate having a deviation in refractive index of ±0.005 from the glass fiber reinforcement may be used as the curable resin (B).

In this case, when the deviation in refractive index is outside of ±0.005, transparency may be degraded. As a result the silica/quartz fibers are mixed with the resin within the range described above.

Additionally, the glass fibers (a) included in the glass fiber reinforcement (A) are used as a reinforced material, and thus may be used in the form of woven fabrics, non-crimp fabrics, non-woven fabrics, filaments, or combinations thereof.

Further, the glass fiber reinforcement (A) may optionally further include a carbon fiber tape (b) in addition to the glass fibers (a), depending on characteristics of a molded article to be prepared. In this case, an overlapping region between the glass fibers (a) and the carbon fiber tape (b) may be opaque.

Here, the glass fiber reinforcement (A) may be used in an amount of 50 to 250 parts by weight, based on 100 parts by weight of the curable resin (B). When the content of the glass fiber reinforcement is less than 50 parts by weight, a hardness-reinforcing effect may be insufficient. On the other hand, when the content of the glass fiber reinforcement is greater than 250 parts by weight, there is a limit to impregnation of the resin. As a result, the glass fiber reinforcement (A) may be used within this content range.

The ruthenium-based catalyst (C) used in the various forms of the present disclosure refers to a ruthenium (Ru) metal-based catalyst used in metathesis in which two compounds react with each other to exchange their constituent atoms or atom groups, thereby preparing two new compounds. In the present disclosure, a ruthenium metal-based metathesis catalyst including at least one selected from the group consisting of molybdenum (Mo), tungsten (W), and osmium (Os) may be used as the ruthenium-based catalyst (C). However, any ruthenium-based catalyst (C) may be used without limitation as long as the ruthenium-based catalyst can cleave a double bond of the resin to perform polymerization.

The ruthenium-based catalyst may be used in an amount of 0.2 to 2 parts by weight. When the content of the ruthenium-based catalyst is less than 0.2 parts by weight, a polymerization reaction may not be initiated, or non-uniform polymerization may occur. On the other hand, when the content of the ruthenium-based catalyst is greater than 2 parts by weight, an increase in molecular weight distribution may be encountered, and it is difficult to adjust a reaction speed. As a result, the ruthenium-based catalyst may be used within this content range.

In another form of the present disclosure, transparency of the composite may be realized using the curable resin capable of minimizing a deviation in refractive index from the glass fiber reinforcement. In addition, since the composite has excellent physical properties such as impact resistance, scratch resistance, weather resistance, and high hardness, the composite may replace a material of conventional transparent windows, as will be seen in the Test Example provided below.

Also, the present disclosure provides a method of preparing a lightweight transparent composite, which includes (i) preparing a glass fiber reinforcement (A) having a refractive index of 1.4 to 1.6 in a forming mold, and (ii) injecting a polymer resin into the forming mold containing the glass fiber reinforcement (A), and thermally curing and molding the polymer resin. Here, the polymer resin may include a curable resin (B) having a deviation in refractive index of −0.005 to +0.005 from the glass fiber reinforcement (A) and a ruthenium-based catalyst (C).

Step (i) is to prepare a glass fiber reinforcement (A) having a refractive index of 1.4 to 1.6 in a forming mold. As described above, the glass fiber reinforcement (A) includes one or more glass fibers (a) selected from the group consisting of S-glass fibers having a refractive index of 1.500 to 1.540, E-glass fibers having a refractive index of 1.540 to 1.570, and silica/quartz fibers having a refractive index of 1.450 to 1.460. In this case, the glass fibers (a) are homogenous materials whose deviation in refractive index is less than 0.005, and may be used in the form of woven fabrics, non-crimp fabrics, non-woven fabrics, filaments, or combinations thereof.

The glass fiber reinforcement (A) may further include a carbon fiber tape (b). When the glass fiber reinforcement (A) includes the carbon fiber tape (b), the glass fiber reinforcement (A) in step (i) refers to a glass fiber reinforcement pre-formed by partially overlapping the glass fibers (a) and the carbon fiber tape (b) coated with a nylon-based binder and thermally pressing the partial overlapping region between the glass fibers (a) and the carbon fiber tape (b) at 200 to 250° C. In this case, when the pressing temperature is less than 200° C., it is difficult to maintain dimensional stability since a binder is not completely melted. On the other hand, when the pressing temperature is greater than 250° C., a sizing agent present on surfaces of fibers may be decomposed, resulting in a decrease in interfacial adhesion to the resin. As a result, the thermal pressing may be performed within this temperature range. FIG. 1 is a diagram showing a composite according to one form of the present invention, which is prepared using S-glass fibers having a refractive index of 1.500 to 1.540, polydicyclopentadiene (pDCPD) having a refractive index of 1.510 to 1.515, ethylene norbornene having a refractive index of 1.530 to 1.540, and a carbon fiber tape.

Such a carbon fiber tape (b) may be stacked with up to three layers on a region which requires no transparency, for example, a region in which a window is laminated onto a car frame, upon preparation of the composite. Here, the carbon fiber tape may be prepared in the form of a sheet having a certain width by spreading carbon fibers. In this case, a sheet having a thickness of approximately 0.3 mm may be used as the carbon fiber tape, but the present disclosure is not particularly limited thereto.

That is, the carbon fiber tape may be applied to an edge region of a molded article to be prepared using the composite. In this case, hardness of the molded article may be further improved accordingly. Here, the region to which the carbon fiber tape is applied may be designed according to a type of the molded article.

In addition, the nylon-based binder applied onto the carbon fiber tape refers to at least one selected from the group consisting of Nylon 6, Nylon 11, Nylon 12, Nylon 46, Nylon 410, Nylon 66, Nylon 610, Nylon 612, Nylon 1010, and Nylon 1212. In this case, the nylon-based binder may be used in an amount of 1 to 3% by weight, based on the total weight of the carbon fiber tape. When the content of the nylon-based binder used is less than 1% by weight, dimensional stability may be degraded. On the other hand, when the content of the nylon-based binder used is greater than 3% by weight, impregnation and flow of the resin may be hampered. As a result, the nylon-based binder may be used within this content range.

Step (ii) includes injecting a polymer resin into the forming mold containing the glass fiber reinforcement (A), and thermally curing and molding the polymer resin. Here, the polymer resin may include a curable resin (B) having a deviation in refractive index of −0.005 to +0.005 from the glass fiber reinforcement (A), and a ruthenium-based catalyst (C).

As described above, the glass fiber reinforcement (A) and the ruthenium-based catalyst (C) may be used in amounts of 50 to 250 parts by weight and 0.2 to 2 parts by weight, respectively, based on 100 parts by weight of the curable resin (B).

The curable resin (B) may be optionally used according to a type of the glass fiber reinforcement. Specifically, a resin including polydicyclopentadiene and ethylene norbornene may be used when the S-glass fibers are selected, at least one resin selected from the group consisting of aromatic urethane acrylate, aromatic urethane diacrylate, aromatic urethane multiacrylate, halogen-substituted urethane acrylate, and sulfur (S)-containing urethane acrylate may be used when the E-glass fibers are selected, and urethane acrylate may be used when the silica/quartz fibers are selected.

In addition, in step (ii), the injecting may be performed at a temperature of 10 to 60° C., alternatively, at a temperature of 20 to 30° C. When the injection temperature is less than 10° C., an injection time may be extended due to high resin viscosity, resulting in delayed reaction initiation. On the other hand, when the injection temperature is greater than 60° C., a cross-linking reaction may occur, resulting in an increase in viscosity. As a result, the injecting may be performed within this temperature range.

Next, the thermal curing may be performed at a temperature of 45 to 95° C., alternatively, at a temperature of 60 to 80° C. As such, the lightweight transparent composite prepared by the method according to one-form of the present invention has excellent physical properties such as impact resistance, scratch resistance, weather resistance, and high hardness, and thus may be applied to a molded article for transparent automobile windows. Specifically, the lightweight transparent composite may be applied to products having glass such as a moving window for panorama sunroofs, a rear window, delta glass (a window between a car A pillar and a rear-view mirror), quarter glass (a window between a car back door and a C or D pillar), etc.

Hereinafter, one or more forms of the present disclosure will be described in more detail with reference to the following examples. However, these examples are not intended to limit the purpose and scope of the one or more forms of the present invention.

EXAMPLES

The following Examples illustrate the scope of the present disclosure and are not intended to limit the same.

Example 1 to 4

Preparation of Lightweight Transparent Composite

Example 1

S-glass fibers having a refractive index of 1.525 were unidirectionally arranged to prepare 8 sheets having a thickness of approximately 0.4 mm. It was assumed that an angle formed between a bumper of a vehicle and an imaginary line connecting the bumper was set to 0°, and that the sheets were stacked at angles of 0°, 45°, −45°, 90°, 90°, −45°, 45°, and 0°, as shown in FIG. 2. Three layers of the carbon fiber tape having a thickness of approximately 0.3 mm were stacked onto the bottom edges of the stacked glass fibers, as shown in FIG. 2.

In this case, 3% by weight of a powdery nylon-based binder was applied to the carbon fiber tape and an overlapping region between the glass fiber sheet and carbon fiber edges, based on the total weight of the carbon fiber tape. Thereafter, the stacked glass fibers were heated at approximately 200° C., pressed, and pre-formed, thereby preparing a glass fiber reinforcement. The prepared glass fiber reinforcement was safely put into a forming mold in the form of a fixed window for panorama sunroofs, and a polymer resin obtained by homogenizing 60 parts by weight of polydicyclopentadiene having a refractive index of 1.515, 40 parts by weight of ethylene norbornene having a refractive index of 1.540, and 1 parts by weight of a ruthenium-based catalyst was injected at a temperature of 20° C. into the forming mold containing the glass fiber reinforcement. Then, the resulting mixture was heated to 60° C., and then cured for approximately 5 minutes to obtain a fixed window.

Example 2

A fixed window was obtained by performing molding in the same manner as in Example 1, except that S-glass fibers having a refractive index of 1.520, 50 parts by weight of polydicyclopentadiene having a refractive index of 1.510, and 50 parts by weight of ethylene norbornene having a refractive index of 1.530 are used herein.

Example 3

A fixed window was obtained by performing molding in the same manner as in Example 1, except that E-glass fibers having a refractive index of 1.560, 23 parts by weight of aromatic urethane acrylate having a refractive index of 1.499, and 77 parts by weight of aromatic urethane diacrylate having a refractive index of 1.578 were used, and the resulting mixture was molded through treatment with UV light instead of the ruthenium-based catalyst.

Example 4

A fixed window was obtained by performing molding in the same manner as in Example 3, except that 100 parts by weight of urethane acrylate having a refractive index of 1.460 was used together with 3.2-mm-thick non-woven fabrics formed of silica having a refractive index of 1.458.

Comparative Example 1

Use of Tempered Glass

A fixed window molded from a 3.2-mm-thick tempered glass for automobiles heat-treated at a high temperature of 700° C. was prepared.

Comparative Example 2

Use of Bisphenol A-type Epoxy Resin

A fixed window was prepared by performing molding in the same manner as in Example 3, except that a polymer resin including an aromatic amine-based curing agent and an epoxy resin having a refractive index of 1.558 was injected, and a forming mold was heated to 100° C. to cure the resulting mixture for 90 minutes.

Comparative Example 3

Use of Polycarbonate Resin

A fixed window was prepared by injection-molding a commercially available bisphenol A-type polycarbonate resin for injection molding to thickness of 4 mm.

TEST EXAMPLES

Test Example

Measurement of Physical Properties

Physical properties of the fixed windows for panorama sunroofs prepared in Examples 1 to 4 and Comparative Examples 1 to 3 were measured. Results are listed in the following Table 1. In addition, test methods of measuring the physical properties listed in the following Table 1 are as follows.

(1) Density: Measured at room temperature (23° C.) according to a method specified in ASTM D792.

(2) Light transmissivity (%): Measured according to a method specified in ASTM D1003.

(3) Flexural modulus (GPa): Measured according to a method specified in ASTM D790.

(4) Steel ball impact strength: Impact strength is measured by dropping a steel ball having a diameter of 82 mm and a weight of 2,260 g from a height of 5 m according to ISO 15082.

(5) Weather resistance: A ΔE value is determined using a Xenon arc lamp Weather-o-meter specified in ISO 105 after a fixed window is irradiated with 2,500 kJ/m² (340 nm).

(6) Scratch resistance (ΔHaze): A wear test was performed 500 times on a fixed window using a Taber testing machine equipped with a grinding wheel having a weight of 500 g according to ISO 15082, and a haze value is measured and compared to an initial haze value.

(7) Coefficient linear expansion ($10^{-6}$ m/m·K): Measured according to a method specified in ISO 11359-2.

(8) Measurement of refractive index: Measured according to ISO 489 Method A (using an Abbe refractometer).

tance, weather resistance, and hardness while maintaining transparency of materials when a glass fiber reinforcement and a certain curable resin are selected and mixed so that a deviation in refractive index between the glass fiber reinforcement and the curable resin is ±0.005, and the resulting mixture is thermally cured. The lightweight transparent composite may be applied as an alternative to transparent

TABLE 1

| Items | Test standards | Examples | | | | Comparative Examples | | |
|---|---|---|---|---|---|---|---|---|
| | | 1 | 2 | 3 | 4 | 1 | 2 | 3 |
| Density | ASTM D792 | 1.79 | 1.79 | 1.80 | 1.56 | 2.46 | 1.98 | 1.2 |
| Light transmissivity (%) | ASTM D1003 | 73 | 77 | 71 | 70 | 99 | 67 | 89 |
| Flexural modulus (GPa) | ASTM D790 | 48 | 51 | 46 | 25 | 80 | 42 | 2.5 |
| Steel ball impact strength | ISO 15082 | Not damaged | Not damaged | Not damaged | Not damaged | Damaged | Not damaged | Not damaged |
| Weather resistance | ISO105 | 0.7 | 0.8 | 1.1 | 0.9 | Not changed | 14 | 7.5 |
| Scratch resistance (ΔHaze) | ISO 15082 | 4 | 5 | 4 | 3 | 1 | 6 | 40 |
| Coefficient linear expansion ($10^{-6}$ m/m · K) | ISO 11359-2 | 16.7 | 16.4 | 10.8 | 13.2 | 2.9 | 15.8 | 80 |

As listed in Table 1, it could be seen that the fixed windows prepared in Examples 1 to 4 of the present invention showed a transmissivity of 70% or more, and were safe even under external impact and lighter in weight by approximately 30%, thereby making it possible to provide lightweight transparent automobile windows.

On the other hand, it could be seen that the fixed window of Comparative Example 1 which was a transparent window in which a conventional glass material was used as tempered glass was easily broken by falling rocks as simulated to measure steel ball impact strength. In addition, it could be seen that, when the epoxy resin was used as in Comparative Example 2, transparency of the fixed window was lowered due to certain colors (yellow) derived from chromophores of the epoxy resin even when it was possible to adjust the refractive indexes of the glass fiber reinforcement and the polymer resin, and the fixed window was easily discolored due to lack of weather resistance required for outdoor exposure test conditions.

The fixed window prepared in Comparative Example 3 was lighter in weight by 50%, compared to glass, but noise radiated by juddering of a moving window encountered during driving due to insufficient hardness, and weather resistance and scratch resistance were insufficient. Therefore, subsequent processes such as coating were required to compensate for the insufficient weather resistance and scratch resistance, resulting in an increase in manufacturing costs. In addition, since the fixed window of Comparative Example 3 had a large difference in coefficient linear expansion from conventional glass products, long-term durability of the fixed window was degraded under the influence of internal stress caused by shrinkage and expansion according to change in external temperature.

Therefore, the lightweight transparent composite according to the teachings of the present invention has excellent physical properties such as impact resistance, scratch resistance, weather resistance, and hardness while maintaining transparency of materials when a glass fiber reinforcement and a certain curable resin are selected and mixed so that a deviation in refractive index between the glass fiber reinforcement and the curable resin is ±0.005, and the resulting mixture is thermally cured. The lightweight transparent composite may be applied as an alternative to transparent windows made of the glass materials in various fields, such as automobiles, aircrafts, ships, civil engineering, etc.

As a transparent material capable of replacing conventional glass materials, the lightweight transparent composite according to one form of the present disclosure includes glass fibers, and thus can be useful in adjusting a difference in refractive index from the curable resin to maintain transparency while improving hardness. Accordingly, the lightweight transparent composite can be provided as a material for transparent automobile windows having improved impact resistance, scratch resistance, and weather resistance, and also achieve an effect of improving automobile fuel efficiency.

In addition, the lightweight transparent composite according to one form of the present invention may be provided for transparent automobile windows. The lightweight transparent composite can be provided for products having glass such as a moving window for panorama sunroofs, a rear window, delta glass (a window between a car A pillar and a rear-view mirror), quarter glass (a window between a car back door and a C or D pillar), etc. When an A pillar is replaced with the transparent composite, a driver's view can be readily ensured, giving a wide sense of openness.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A composition for preparing a lightweight transparent composite, comprising:
   (A) a glass fiber reinforcement having a refractive index of 1.4 to 1.6;

(B) a curable resin having a deviation in refractive index of −0.005 to +0.005 from the glass fiber reinforcement (A); and (C) a ruthenium-based catalyst which is a ruthenium metal-based metathesis catalyst comprising at least one selected from the group consisting of molybdenum (Mo), tungsten (W), and osmium (Os).

2. The composition of claim 1, wherein the composition comprises 50 to 250 parts by weight of the glass fiber reinforcement (A), and 0.2 to 2 parts by weight of the ruthenium-based catalyst (C), based on 100 parts by weight of the curable resin (B).

3. The composition of claim 1, wherein the glass fiber reinforcement (A) comprises one or more glass fibers (a) selected from the group consisting of S-glass fibers having a refractive index of 1.500 to 1.540, E-glass fibers having a refractive index of 1.540 to 1.570, and silica/quartz fibers having a refractive index of 1.450 to 1.460.

4. The composition of claim 3, wherein the glass fibers (a) are homogenous materials whose deviation of refractive index is less than 0.005, and are in the form of woven fabrics, non-crimp fabrics, non-woven fabrics, filaments, or combinations thereof.

5. The composition of claim 1, wherein the curable resin (B) is selected according to a type of the glass fiber reinforcement,
wherein a resin including polydicyclopentadiene and ethylene norbornene is selected when the S-glass fibers are used;
at least one resin selected from the group consisting of aromatic urethane acrylate, aromatic urethane diacrylate, aromatic urethane multiacrylate, halogen-substituted urethane acrylate, and sulfur (S)-containing urethane acrylate is selected when the E-glass fibers are used; and
urethane acrylate is selected when the silica/quartz fibers are used.

6. The composition of claim 3, wherein the glass fiber reinforcement (A) optionally further comprises a carbon fiber tape (b) in addition to the glass fibers (a),
an overlapping region between the glass fibers (a) and the carbon fiber tape (b) is opaque.

7. A method of preparing a lightweight transparent composite, comprising:
(i) preparing a glass fiber reinforcement (A) having a refractive index of 1.4 to 1.6 in a forming mold; and
(ii) injecting a polymer resin into the forming mold containing the glass fiber reinforcement (A), and thermally curing and molding the polymer resin, wherein the polymer resin comprises a curable resin (B) having a deviation in refractive index of −0.005 to +0.005 from the glass fiber reinforcement (A) and a ruthenium-based catalyst which is a ruthenium metal-based metathesis catalyst comprising at least one selected from the group consisting of molybdenum (Mo), tungsten (W), and osmium (Os).

8. The method of claim 7, wherein the glass fiber reinforcement (A) comprises one or more glass fibers (a) selected from the group consisting of S-glass fibers having a refractive index of 1.500 to 1.540, E-glass fibers having a refractive index of 1.540 to 1.570, and silica/quartz fibers having a refractive index of 1.450 to 1.460.

9. The method of claim 8, wherein the glass fibers (a) are homogenous materials whose deviation of refractive index is less than 0.005, and are in the form of woven fabrics, non-crimp fabrics, non-woven fabrics, filaments, or combinations thereof.

10. The method of claim 7, wherein the glass fiber reinforcement (A) optionally further comprises a carbon fiber tape (b) in addition to the glass fibers (a),
the glass fiber reinforcement (A) in step (i) is pre-formed by partially overlapping the glass fibers (a) and the carbon fiber tape (b) coated with a nylon-based binder and thermally pressing the partial overlapping region between the glass fibers (a) and the carbon fiber tape (b) when the glass fiber reinforcement (A) comprises the carbon fiber tape (b).

11. The method of claim 10, wherein the partially overlapping region between the glass fibers (a) and the carbon fiber tape (b) is opaque.

12. The method of claim 7, wherein the curable resin (B) is selected according to a type of the glass fiber reinforcement,
wherein a resin including polydicyclopentadiene and ethylene norbornene is selected when the S-glass fibers are used;
at least one resin selected from the group consisting of aromatic urethane acrylate, aromatic urethane diacrylate, aromatic urethane multiacrylate, halogen-substituted urethane acrylate, and sulfur (S)-containing urethane acrylate is selected when the E-glass fibers are used; and
urethane acrylate is selected when the silica/quartz fibers are used.

13. The method of claim 7, wherein, in step (ii), the injecting is performed at a temperature of 10 to 60° C., and the curing is performed at a temperature of 45 to 95° C.

14. A lightweight transparent composite prepared by the method defined in claim 7.

15. A molded article for transparent automobile windows prepared using the lightweight transparent composite defined in claim 14.

* * * * *